June 2, 1964   J. O. MELTON ETAL   3,135,507
SPACER FOR ADJUSTING THE LENGTH OF A COIL
SPRING UNDER COMPRESSION
Filed Sept. 25, 1961

INVENTORS
James O. Melton &
BY Thomas B. Wilkinson

Dunlap, Laney & Hubbard
ATTORNEYS

United States Patent Office 3,135,507
Patented June 2, 1964

3,135,507
SPACER FOR ADJUSTING THE LENGTH OF A COIL SPRING UNDER COMPRESSION
James O. Melton, Norman, and Thomas B. Wilkinson, Oklahoma City, Okla., assignors to Jamco, Inc., Oklahoma City, Okla., a corporation of Oklahoma
Filed Sept. 25, 1961, Ser. No. 140,521
8 Claims. (Cl. 267—20)

This invention relates to a spacing element for adjusting the effective length of a coil spring which is normally retained under compression between two bodies spaced from each other. More particularly, but not by way of limitation, the present invention relates to a spacing element adapted for insertion between the lowermost convolution of a coil spring of the type utilized in automobile running gear, and the spring retainer on the lower control arm of the front suspension of the automobile.

As it is well known to automobile repair and maintenance personnel, the coil springs which are utilized in the front suspension of an automobile's running gear are prone to sag and become compressed to some degree as a result of age, overloading, or hard driving over bad roads. The results of such sagging have been uneven carriage of the automobile body, that is, one side of the front end dipping closer to the road than the other side, and also the failure of the springs to function effectively in preventing metal-to-metal contact between the chassis and and the lower suspension arm of the automobile when a road shock of large magnitude is encountered. Fatigued, sagging springs also cause the automobile to steer erratically and less easily upon application of the brakes.

It has heretofore been the practice of automobile maintenance personnel to effect a partial correction of the undesirable results stemming from the fatiguing and sagging of the coil springs by inserting spacing blocks between some of the convolutions of the springs, or by inserting an arcuate spacing element underneath the spring between the lowermost convolution thereof and the spring retainer which is attached to the A-shaped lower control arm of the automobile. These spacers all function to increase the spacing between the upper and lower control arms to its original status.

The types of spacing blocks, or "spacers" as they will hereinafter be termed, which have previously been utilized to correct the sagging spring situation have been of two general types, both of which are usually constructed of aluminum. One of the types of spacers utilized comprises a small generally rectangular block which is inserted between the convolutions of the spring intermediate the ends of the springs. The blocks are grooved to accommodate the spring convolutions so that when the block is inserted between two of the spring convolutions, the convolutions are received in opposed grooves located on opposite sides of the block and spaced from each other by a distance corresponding to the thickness of the spacer between the troughs of the grooves. The other type of spacer which has previously been used to increase the effective length of fatigued coil springs comprises an aluminum block of generally circular configuration which carries a groove in its upper surface, and which rests upon the spring retainer of the lower control arm of the automobile. The lowermost convolution of the spring is supported in the mating groove at the top of the circular spacer. The aluminum metal of which this type of spacer is constructed, is made sufficiently soft to permit the effective diameter of the spacer to be altered in order to adapt the spacer to cooperation with springs of various sizes.

In the case of both of the types of spacers previously utilized, the utilization of a metallic construction in the spacer results in the generation of considerable squeaking noise when the spring flexes and frictionally slides upon the spacers. Moreover, there is, in the case of the circular aluminum spacer, a considerable degree of difficulty in inserting the spacer between the lowermost convolution of the coil spring and the spring retainer of the lower control arm. In order to accomplish such insertion, the spring must be wedged upwardly from the control arm so that it is more highly compressed than in its normal operating position. The circular aluminum spacer is then placed under the spring and its diametric and circumferential dimensions adjusted to conform to the spring. This is not only a time-consuming and rather difficult operation considering the relative inflexibility of the aluminum, but it is also dangerous, since the compressed coil spring sometimes is accidentally released from its compressed state and snaps downwardly crushing the hands or fingers of the mechanic or maintenance man. Additionally, the spacers which have been previously utilized have also lacked ideality in that the aluminum material of construction, possessing no quality of resiliency, can afford no cushioning to absorb road shocks. This, of course, results in a "harder" ride being afforded by the vehicle, and also causes the aluminum spacers to break down by splitting or cracking when the automobile is subjected to extreme operating conditions by being driven over very rough roads.

The present invention comprises a novel and highly effective spacer of the arcuate or generally cylindrical type which is adapted to be inserted beneath the coil spring between its lowermost convolution and the spring retaining element of the lower control arm. Broadly, the spacer of the invention includes a pair of generally semicircular segments which are connected to each other at one of their ends by means of a tongue and groove type of joint. The construction of this joint is such that the two segments of the spacer can pivot freely in a horizontal plane extending generally normal to the coil spring, but are unable to move in a vertical direction when installed in place beneath the spring. With the freedom of movement afforded by the tongue and groove joint connecting the two segments, the spacer can be fitted to any type of coil spring. More importantly, such fitting and conformity to the configuration of the lowermost spring convolution can be effected quite rapidly so that there is less risk of the fingers and hands of the mechanic being pinched or crushed in the event the coil spring is accidentally released from its withdrawn compressed position. A groove is formed in the upper surface of each of the semicircular segments for the accommodation of the lowermost convolution of the spring and the groove in one of the segments terminates short of the free unconnected end of that segment so that a transverse wall or barrier is formed by the segment against which the free end of the coil spring may abut.

An important feature of the coil spring spacers of the present invention is the particular material of construction which is employed in their fabrication. These spacers are made of relatively high density synthetic resins having a low coefficient of friction and possessing resilient properties. In a preferred embodiment of the invention, the spacers are constructed of high density polyethylene of the type sold under the tradename of "Marlex." We have found that, when spacers constructed of this material are utilized, such spacers are characterized by a long operating life, unaffected by splitting or chipping resulting from recurring road shocks and abusive use of the automobile. This appears to be, in large part, due to the resilient properties of the high density resin which allow it to give or yield to shocks imparting forces of compression to the spacer, but to regain its original shape after absorbing the impact of such shock. Another highly useful result which accrues from the use of the spacers constructed of high density synthetic resin is the elimination of noise resulting from the frictional contact of the coil spring with the surface of the spacer. Finally, the synthetic resin is sufficiently flexible so that any alteration in configuration of the spacer which is required to conform the spacer to minor distortions of the lowermost convolution of the coil spring can be easily effected manually by the installing personnel.

From the foregoing description, it will be apparent that a broad object of the present invention is to provide spacers adapted for insertion under the lowermost convolutions of the coil springs used in the front end suspension of automobiles and the like, which spacer enables the automobile to be driven more quietly and smoothly than automobiles equipped with previously existing types of spacers.

An additional object of the present invention is to provide a coil spring spacer which may be easily conformed to the convolutions of coil springs of varying sizes.

Another object of the present invention is to provide a segmented, generally circular spacer for use between the coil springs of an automobile and their spring retainers, which coil spring may be easily disjointed into its segments for ease of packaging, shipment and storage.

An additional object of the present invention is to provide a new type of segmented circular spacer for use beneath the lowermost convolution of automobile coil springs, which spacer, by virtue of its resiliency and the freedom of movement permitted by the joint connecting its segments, is securely retained in proper position beneath the coil spring for longer periods of time than the types of coil spring spacers heretofore utilized.

An additional object of the present invention is to provide a spacer for insertion beneath the lowermost convolution of a coil spring of the type used in the front end suspension of an automobile, which spacer is inexpensive in construction and is characterized by long and effective operating life.

A better understanding of the foregoing described objects and advantages, as well as a perception of additional objects and advantages, will be obtained by a reading of the following disclosure in conjunction with a perusal of the accompanying drawings which illustrate our invention.

Figure 1:
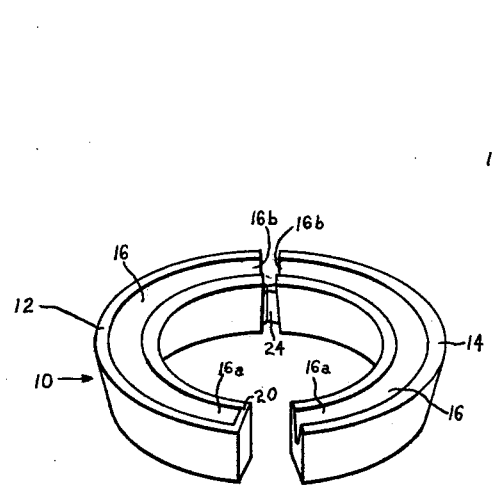
FIGURE 1 is a perspective view of a coil spring spacer constructed according to the present invention.
Figure 2:
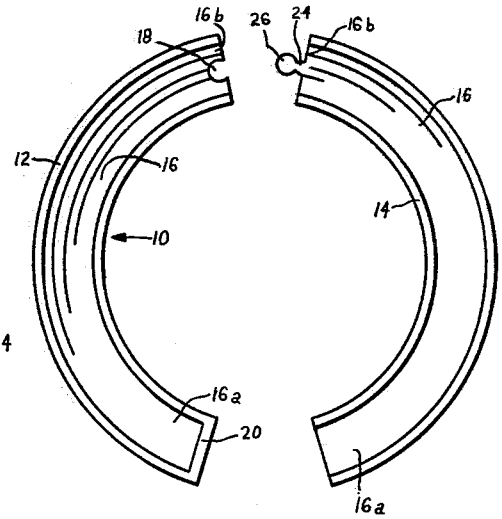
FIGURE 2 is a plan view of the spacer illustrated in FIGURE 1 and showing the two segments of the spacer in disconnected relation.

Referring now to the drawings, and particularly to FIGURES 1 and 2, the arcuate, generally circular spacer of the present invention is designated generally by reference character 10. The spacer 10 is comprised of a pair of arcuate segments 12 and 14 which are each arcs of a circle including angles of less than 180°. Each of the segments 12 and 14 is provided with a groove 16 in its upper surface for receiving and supporting the lowermost convolution of a coil spring. The grooves 16 are semicircular in transverse cross-section to mate with the outer periphery of the coil spring. The groove 16 in the segment 14 is open at both its ends 16a and 16b while the groove 16 in the segment 12 is open at its end 16b which is adjacent a generally cylindrical socket 18 formed in the corresponding end of segment 12, and is closed at its other end 16a by a transversely extending web 20 of the segment 12. This transversely extending web 20 provides a positive stop against which the free end of the coil spring abuts when the spacer is in its operative position as hereinafter described.

A tongue is secured to the face of one end of the segment 14 and includes a stem portion 24 and a head 26. The head 26 is of generally cylindrical configuration and is of a size to mate with the socket 18. The stem portion 24 is of generally frusto-pyramidal configuration and both the head 26 and stem 24 are preferably molded integrally with the segment 14, which, as has previously been explained, is constructed of a high density synthetic resin such as polyethylene. The stem 24 and head 26 both terminate flush with the bottom of the groove 16 in segment 14 so as not to interfere with the proper seating of the coil spring in the spacer. It will be apparent that the dimensions of the socket 18 and head 26 are such that when the segments 12 and 14 are connected to each other, a joint is formed which permits the segments to be pivoted in a horizontal plane extending normal to the coil spring but which prevents movement of the segments in a vertical plane. This is a particularly important aspect of the invention since it permits the spacer to be easily and quickly conformed to differing sizes of coil springs, yet prevents undesirable deformation of the spacer during its operating life.

Figure 3:
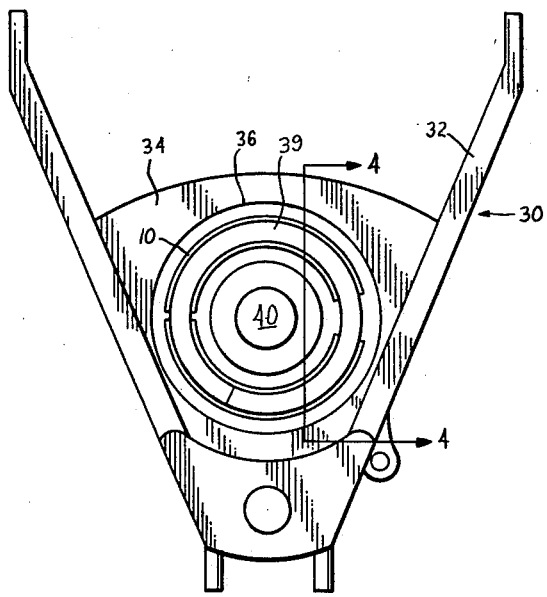
FIGURE 3 is a plan view of the lower support member of the front suspension arm of an automobile with a coil spring supported thereon and spaced therefrom by one of the spacers of the present invention.
Figure 4:
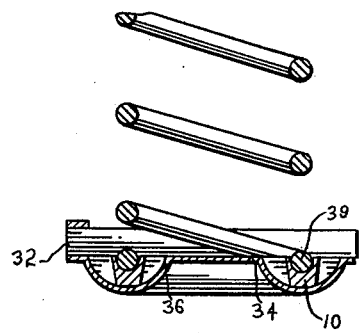
FIGURE 4 is a view in section taken along line 4—4 of FIGURE 3.

Reference is now made to FIGURES 3 and 4 which illustrate the manner in which the spacers of the present invention are installed under the coil springs used in the front suspension system of an automobile.

In the front suspension of many automobiles, a lower control arm designated generally by reference character 30 includes an A-shaped frame 32. Near the vertex of the A-shaped frame 32, a spring retainer plate 34 is secured across the legs of the frame. The spring retainer plate 34 has a concave, annular groove 36 extending concentrically around an aperture (not seen) in the plate 34, which aperture is spaced about midway between the legs of the A-shaped frame 32. The groove 36 is best observed in the sectional view illustrated in FIG. 4.

In automobiles in which no coil spring spacer has been installed, a helically wound coil spring 38 rests upon the spring retainer plate 34 with its lowermost convolution 39 in the concave groove 36. The concave groove 36 is generally of substantially larger transverse width than the diameter of the average spring so that coil springs of differing size may rest in the groove. A shock absorber 40 is axially positioned inside the coil spring and is secured to the spring retainer plate 34 by means of a threaded stud (not seen) which passes through the aperture in the plate 34 and engages a nut on the opposite side of the plate from the shock absorber. Both the shock absorber 40 and the coil spring 38 are connected at their upper ends to the upper control arm (not shown) of the front suspension of the automobile. When the coil spring 38 becomes fatigued and sags due to loss of resilience, the upper and lower control arms are not properly spaced from each other with the undesirable effect on driving ease heretofore mentioned resulting.

In order to restore the proper spacing between the upper and lower control arms, a spacer of arcuate, generally circular configuration is placed between the lowermost convolution 39 of the coil spring 38 and the spring retainer plate 34. In FIG. 4 of the drawings, the high denity resin spacer 10 of the present invention is shown in place between the coil spring 38 and the spring retainer 34. The lower surface of the spacer 10 rests in the groove 36. The lowermost convolution 39 of the coil spring 38 is received in the arcuate grooves 16 formed in the upper surface of each of the segments 12 and 14 of the spacer 10. With the spacer 10 in this position relative to the coil spring 38, the free end (not seen) of the spring 38 abuts against the web 20 of the segment 12. This assists in preventing the spacer 10 from shifting circumferentially or "revolving" under the coil spring 38 during the operation of the automobile.

To install the spacer 10 of the present invention between the lowermost convolution 39 of a fatigued coil spring 38 and its spring retainer plate 34, the mechanic or maintenance man pries or wedges the coil spring 38 upward out of contact with the spring retainer plate 34 and by a distance sufficient to permit the spacer 10 to be inserted beneath the spring. The spacer 10 may then be placed beneath the lowermost convolution 39 of the coil spring 38 and manually conformed to the configuration of the coil spring. This shaping operation is very easily effected, despite variations in coil spring sizes, since the flexibility of the resinous material of the spacer in conjunction with its jointed, segmented construction, makes alteration of the spacer shape a simple operation. Having matched the configuration of the spacer 10 to the dimensions of the coil spring 38, the spring is released and snaps into place in the grooves 16 in the top surface of the spacer segments 12 and 14.

Once in place, the high density resin spacer 10 wears well, is silent in its contact with the coil spring 38 and because of its tendency to constantly conform to the lowermost convolution 39 of the coil spring and the spring retainer groove, is seldom worked out of position during operation of the automobile over extremely rough terrain.

Although a preferred embodiment of the present invention has been illustrated and described by the present application, it will be apparent that certain changes of structure and arrangement may be made in the described embodiment without departing from the inventive concept constituting the invention as set forth in the appended claims.

We claim:

1. In combination with a coil spring and a spring retainer plate which supports said spring, a spring spacer element comprising:
   (a) a pair of arcuate segments supported on said spring retainer plate and each having an arcuate groove in one surface thereof receiving one of the convolutions of said spring and complementary in configuration to the respective segment in which the groove is disposed; and
   (b) joint means for detachably connecting said segments to each other for movement in a plane containing the radii of curvature of said segments.

2. The combination claimed in claim 1 wherein said joint means comprises a hinged connection including a generally cylindrical socket circumscribing at least 180° at one end of one of said arcuate segments, and a mating generally cylindrical projection at one end of the other of said arcuate segments.

3. The combination claimed in claim 1 wherein said spacer is constructed of a resilient, flexible material.

4. The combination claimed in claim 3 wherein said spacer is constructed of a synthetic resin.

5. The combination claimed in claim 4 wherein said spacer is constructed of polyethylene.

6. A spacer adapted for insertion between a coil spring and a spring retainer upon which the coil spring rests, said spacer comprising:
   (a) a pair of arcuate segments each having a groove in one surface thereof for receiving a convolution of said coil spring, and wherein the groove in one of said segments is open at both its ends and extends continuously from one end of said segment to the other end thereof, and the groove in the other of said segments is open at one of its ends and terminates at its second end in spaced relation from one end of said other segment whereby the free end of said coil spring may abut against a portion of said other segment extending transversely across its respective groove at said second end thereof; and
   (b) joint means for detachably connecting said segments to each other for movement in a plane containing the radii of curvature of said segments.

7. A spacer adapted for insertion between a coil spring and a spring retainer plate upon which said coil spring rests, said spacer comprising:
   (a) a pair of synthetic resin, arcuate segments;
   (b) a generally cylindrical socket at one end of one of said arcuate segments; and
   (c) a mating generally cylindrical projection at one end of the other of said arcuate segments, said projection and socket interlocking to form a hinge connection between said arcuate segments for pivotal movement of said segments in a plane containing the radii of curvature of each of said segments.

8. In combination with a coil spring, a spring spacer comprising a pair of synthetic resin, arcuate segments, each having a complementary arcuate groove in one surface thereof receiving a convolution of said coil spring; and joint means pivotally connecting said segments to each other for movement in a plane extending generally normal to a plane containing the axis of said coil spring.

References Cited in the file of this patent

UNITED STATES PATENTS

| | | |
|---|---|---|
| 214,328 | Vose | Apr. 15, 1879 |
| 555,512 | Johnson | Mar. 3, 1896 |
| 838,976 | George | Dec. 18, 1906 |
| 1,428,740 | Akimoff | Sept. 12, 1922 |
| 1,511,396 | Champney et al. | Oct. 14, 1924 |
| 2,527,524 | Brent | Oct. 31, 1950 |
| 2,586,263 | Rose | Feb. 19, 1952 |
| 2,718,894 | Gresham et al. | Sept. 27, 1955 |